US010417772B2

(12) United States Patent
Schwartz et al.

(10) Patent No.: US 10,417,772 B2
(45) Date of Patent: Sep. 17, 2019

(54) PROCESS TO ISOLATE OBJECT OF INTEREST IN IMAGE

(71) Applicant: AETREX WORLDWIDE, INC., Teaneck, NJ (US)

(72) Inventors: Laurence Schwartz, Teaneck, NJ (US); Thomas Trigano, Teaneck, NJ (US); Yuval Bechor, Teaneck, NJ (US)

(73) Assignee: AETREX WORLDWIDE, INC., Teaneck, NJ (US)

( * ) Notice: Subject to any disclaimer, the term of this patent is extended or adjusted under 35 U.S.C. 154(b) by 0 days.

(21) Appl. No.: 15/688,379

(22) Filed: Aug. 28, 2017

(65) Prior Publication Data
US 2018/0096481 A1 Apr. 5, 2018

Related U.S. Application Data
(60) Provisional application No. 62/380,034, filed on Aug. 26, 2016.

(51) Int. Cl.
| *G06K 9/34* | (2006.01) |
| *G06T 7/194* | (2017.01) |
| *G06K 19/06* | (2006.01) |
| *H04N 19/625* | (2014.01) |
| *G06T 17/10* | (2006.01) |
| *G06T 7/11* | (2017.01) |
| *G06T 7/254* | (2017.01) |
| *G06K 9/00* | (2006.01) |

(52) U.S. Cl.
CPC ............... *G06T 7/194* (2017.01); *G06K 9/34* (2013.01); *G06K 19/06* (2013.01); *G06T 7/11* (2017.01); *G06T 7/254* (2017.01); *G06T 17/10* (2013.01); *H04N 19/625* (2014.11); *G06K 9/00362* (2013.01)

(58) Field of Classification Search
CPC ...... G06K 19/06; G06K 9/00362; G06K 9/34; G06T 17/10; G06T 7/194; H04N 19/625
See application file for complete search history.

(56) References Cited

U.S. PATENT DOCUMENTS

| 2013/0083854 A1* | 4/2013 | Pace ..................... H04N 19/14 375/240.16 |
| 2014/0146998 A1* | 5/2014 | Wieser ................. G06K 9/3241 382/103 |
| 2015/0178584 A1* | 6/2015 | Aller ................... G06K 9/3216 382/165 |

OTHER PUBLICATIONS

International Search Report, dated Nov. 8, 2017, and Written Opinion issued in corresponding international Application No. PCT/US17/48894.

* cited by examiner

*Primary Examiner* — Phuoc Tran
(74) *Attorney, Agent, or Firm* — Saul Ewing Arnstein & Lehr LLP

(57) ABSTRACT

A process to isolate objects of interest in an image uses a model which takes into account the artifacts stemming from the JPEG compression. The pixels are sorted accordingly to layers which regroup pixels of similar value, and the background is modeled by a polygon from an additional picture. Segmentation based on the knowledge of the background and the layers is then performed. This method provides good results for segmentation, while being sufficiently fast to be implemented for real time application.

4 Claims, 7 Drawing Sheets
(7 of 7 Drawing Sheet(s) Filed in Color)

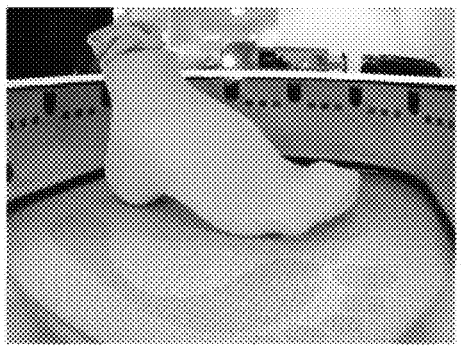
Figure 4A Pink
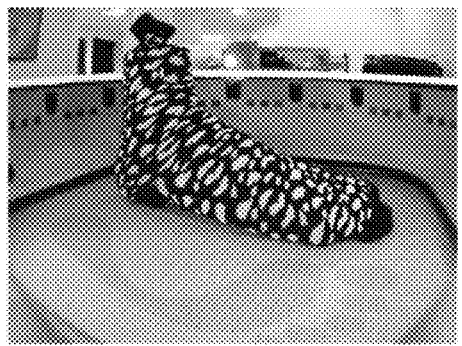
Figure 4B Funky Black
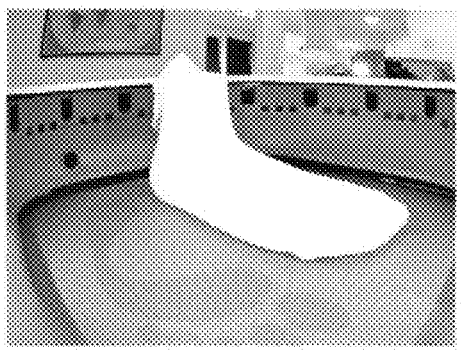
Figure 4C White
Figure 4D Duboni

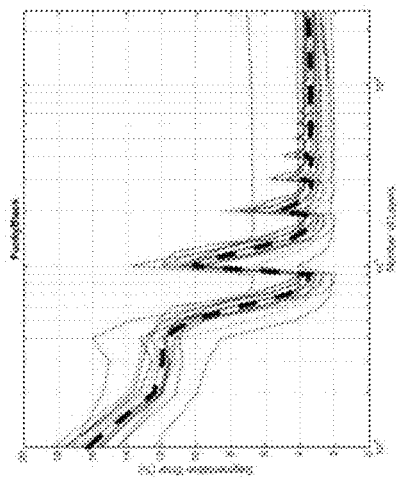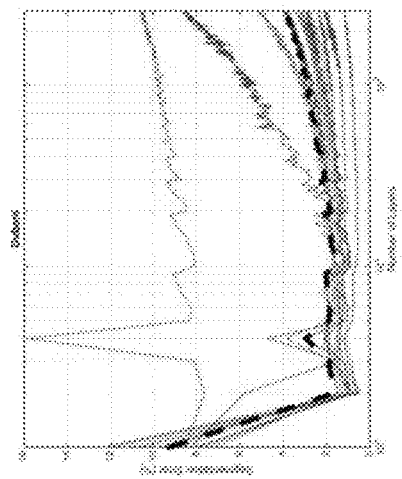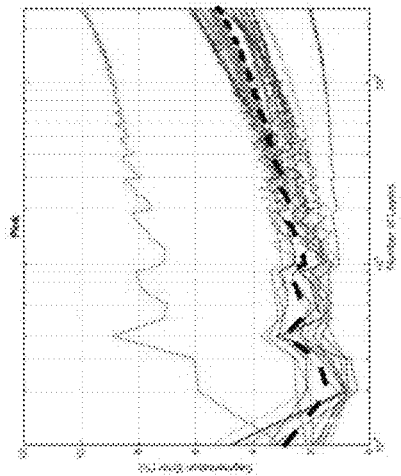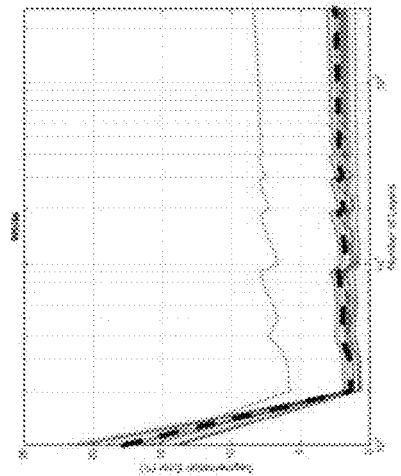

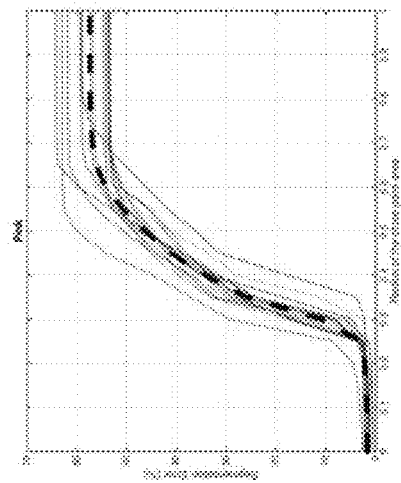
Figure 6A Pink
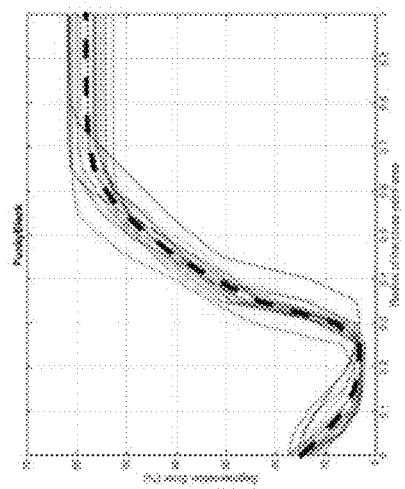
Figure 6B Funky Black
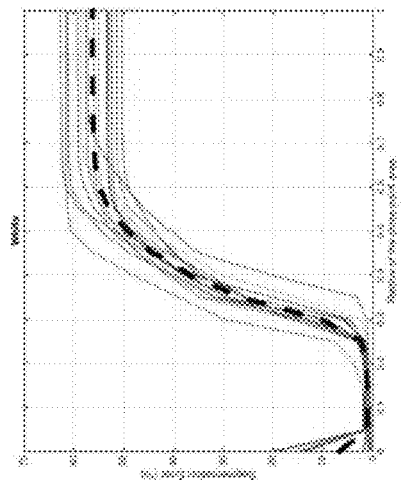
Figure 6C White
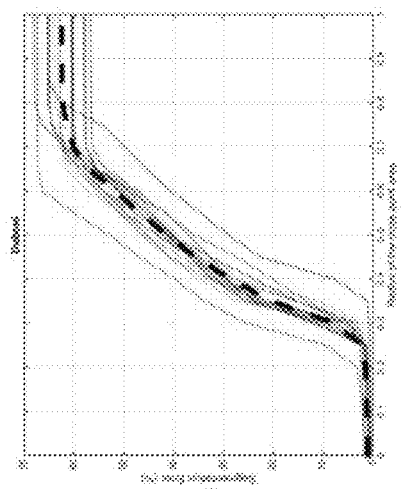
Figure 6D Duboni

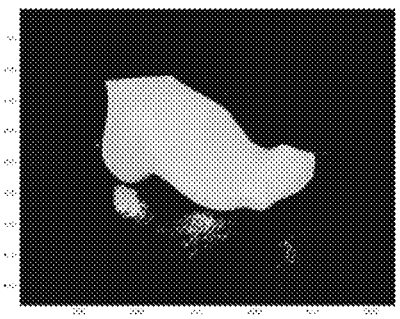
Figure 7A Pink
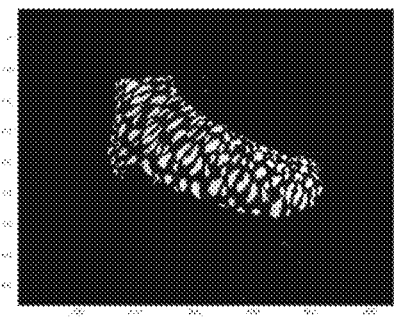
Figure 7B Funky Black
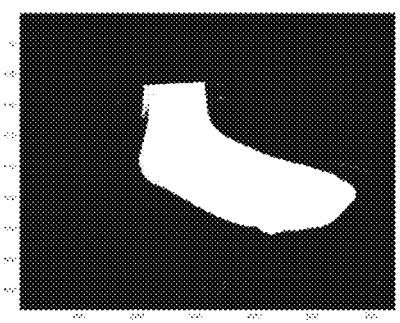
Figure 7C White
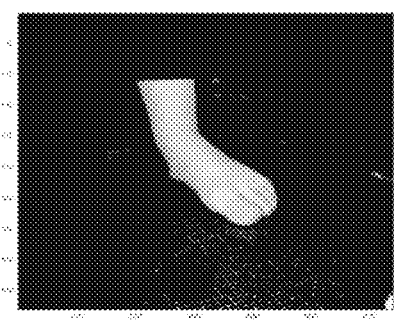
Figure 7D Duboni

PROCESS TO ISOLATE OBJECT OF INTEREST IN IMAGE

CROSS-REFERENCE TO RELATED APPLICATIONS

This application is based on, and claims priority to U.S. provisional Application No. 62/380,034, filed Aug. 26, 2016, the entire contents of which being fully incorporated herein by reference.

BACKGROUND OF THE INVENTION

The problem of efficient background separation from still images is of great practical importance in numerous applications. One of them, which becomes more and more present in the industrial world is the three-dimensional reconstruction of an object, given a set of still images. In order to perform a good reconstruction, an important preliminary step is to remove from the pictures the objects which are not of interest.

State of the art background removal methods focus more on good segmentation performances for still pictures in complex backgrounds. In such cases, segmentation can be seen as an optimization problem in Markov fields or graphs. The obtained algorithms provide extremely good segmentation performances, but the computational complexity makes them less suited for embedded, real-time, applications. For these applications, choosing a suitable color space for color segmentation is very important, since the accuracy of color detection affects segmentation results. The HSV color space (Hue, Saturation, Value) is one of the most used color space in the field. Uses include image enhancement, feature-based classification, or in addition to existing segmentation frameworks. Given a pixel p=(R,G,B) described in the RGB coordinate system, coded with L bits, with a maximum component M=max{R,G,B} and minimum component m=min{R,G,B}, it can be decomposed into the HSV color space accordingly to the following equations:

$$H = \begin{cases} 0 & \text{if } M = m. \\ 60° \times \frac{G-B}{m-m} \mod 360° & \text{if } M = R. \\ 60° \times \left(\frac{B-R}{M-m} + 2\right) & \text{if } M = G. \\ 60° \times \left(\frac{R-G}{M-m} + 4\right) & \text{if } M = B. \end{cases}$$

$$S = \begin{cases} 0 & \text{if } M = m \\ \frac{M-m}{M} & \text{otherwise} \end{cases} \quad (1)$$

$$V = \frac{\max\{R, G, B\}}{2^L - 1} \quad (2)$$

The HSV color space is more fitted for color-based segmentation tasks, as it corresponds more closely to the human perception of color. In the HSV coordinate system, the saturation is a measure of the lack of whiteness in the color, whereas the hue is defined as the angle from the red color axis, and value refers to the brightness. However, most cameras used for embedded applications can provide pictures in JPEG format, that is after a lossy compression. This compression step cannot usually be circumvented, and yields a significant distortion in the data available on the HSV space.

FIGS. 1A-1F illustrate the distortion brought by the lossy compression. In this example, the G component in the RGB space is set to 255, while the R and B components change uniformly from 0 to 255 altogether. The Hue of the original image is equal to ⅓. It can be observed that the JPEG compression introduced a distortion of the Hue, which is particularly visible for dark and white tones.

Numerous embedded devices used for image processing and 3D-reconstruction include cameras which provide JPEG pictures of the object to reconstruct. In this framework, an important step is the segmentation of the image, in order to isolate the object of interest, but the JPEG compression introduces artifacts which can cripple any segmentation procedure. Images must be acquired by technically sophisticated cameras having low compression rates to avoid misclassification of elements in the image due to unwanted artifacts that may appear in images captured by less technically sophisticated cameras. Further, standard background-learning methods utilize slow algorithms, thus reducing the efficiency of prior art systems.

SUMMARY OF THE INVENTION

The invention is a model which takes into account the artifacts stemming from the JPEG compression. The pixels are firstly sorted accordingly to layers which regroup pixels of similar value, and the background is modeled by a polygon from an additional picture. Segmentation based on the knowledge of the background and the layer to process is then performed. Results obtained with a device operating according to these novel principles illustrate that this method provides good results for segmentation, while being sufficiently fast to be implemented for real time application.

In an embodiment of the present invention, the invention comprises isolating an object of interest present in a target image taken of an imaging field, by taking a background image of the imaging field without the object of interest present using an imaging system; taking a target image of the imaging field with the object of interest present using the imaging system; using at least one processor, classifying pixels of the background image according to their brightness; sorting the pixels of the background image into layers of pixels having similar brightness; modeling the background image by a convex polygon; and determining which pixels in the target image fall inside of the convex polygon and which pixels in the target image fall outside of the convex polygon; whereby pixels in the target image that belong outside of the convex polygon are considered to be pixels of the object of interest.

In another embodiment, the images taken by the imaging system are subjected to lossy compression before the pixels are classified, and the lossy compression can comprise JPEG compression.

In another embodiment, the modeling of the background image is performed using a complex hull algorithm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A to 4D show samples of investigated datasets as described herein;

FIGS. 5A to 5D are graphs illustrating influence of the number of layers used on the segmentation results—each curve represents the performances for one of the 16 pictures taken by the scanning device, where the black dotted curve represents the average performance;

FIGS. 6A to 6D are graphs illustrating the influence of the number of layers used on the segmentation results—each curve represents the performances for one of the 16 pictures taken by the scanning device, where the black dotted curve represents the average performance; and FIGS. 7A to 7D show the results on the samples of FIG. 4A to 4D, respectively.

DETAILED DESCRIPTION OF THE INVENTION

In order to understand the invention, it is helpful to understand an environment in which the invention can be used. In this section, a brief overview of an exemplary foot scanning apparatus useable with the invention is provided, and described are a model used and a novel segmentation algorithm used for background removal, from two images taken by the apparatus.

The scanning device described herein is a foot scanner system that measures human feet for the purpose of determining shoe size and insole type. It performs all measurements by using electronic and optical means and does not include any motors or moving parts. It is understood that the process and system described herein are not limited to use with foot scanners.

Figure 1C:
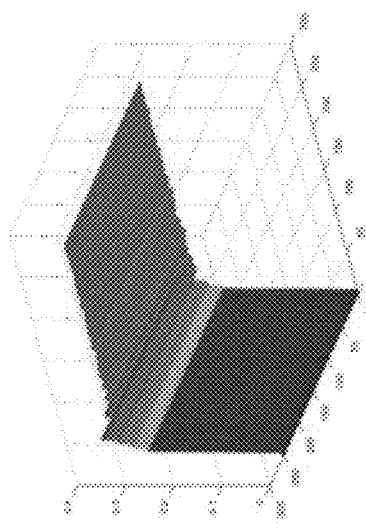
FIGS. 1A-1F show a synthetic image (left, FIGS. 1A, 1B), original hue (middle, FIGS. 1C, 1D) and hue of the JPEG compressed image (right, FIGS. 1E, 1F). A significant distortion is observed for clear tones.
Figure 1E:
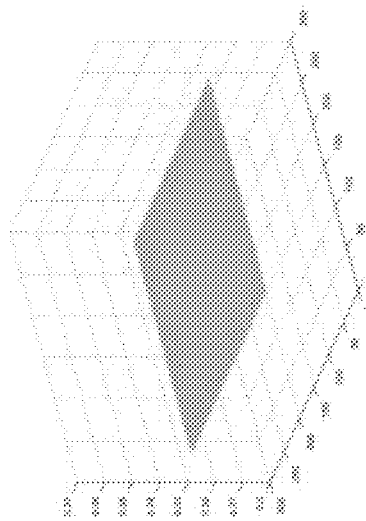
Figure 1A:
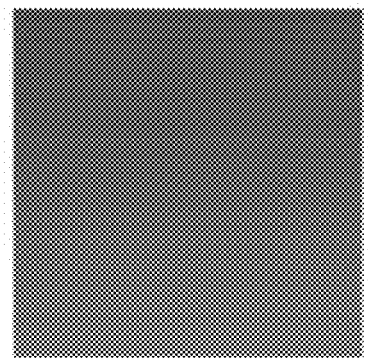
Figure 1D:
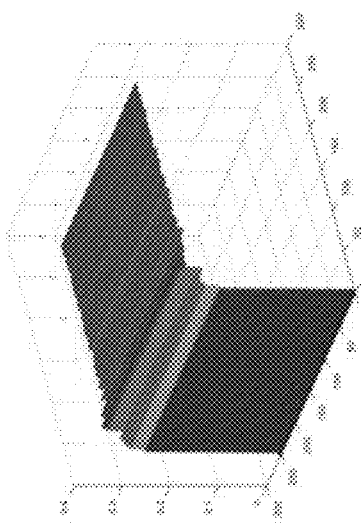
Figure 1F:
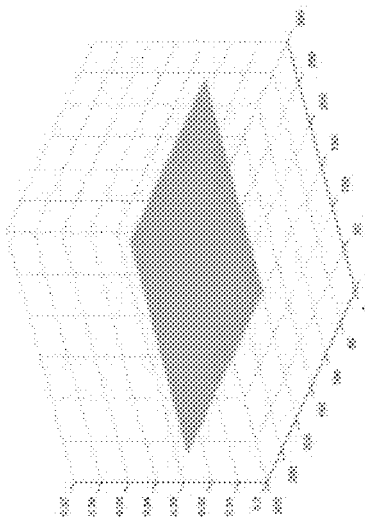
Figure 1B:
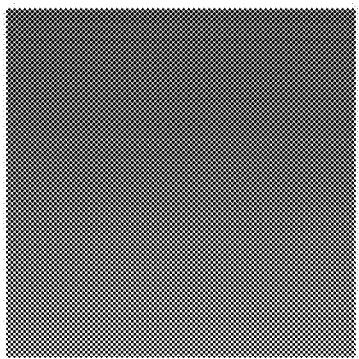
Figure 2:
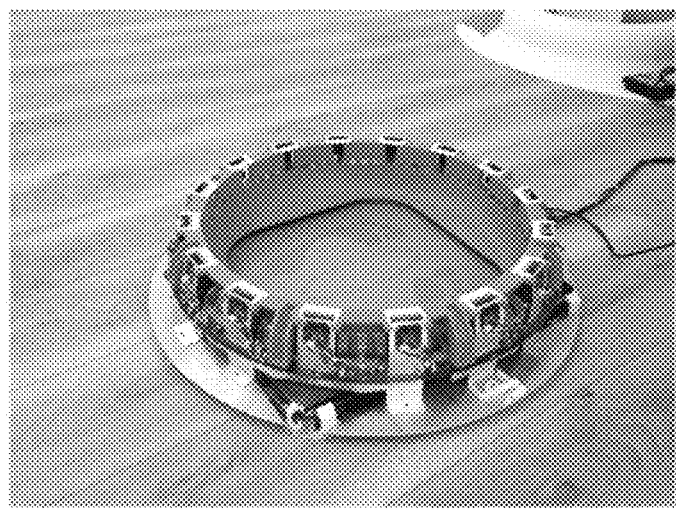
FIG. 2 illustrates a scanning device with which the invention can be used.
Figure 3A:
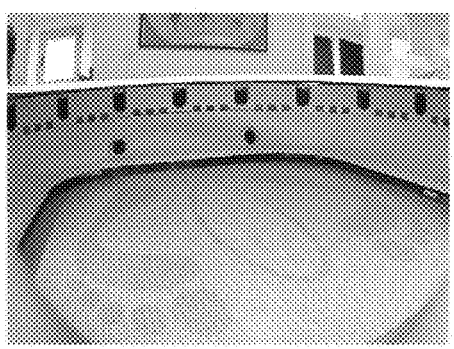
FIGS. 3A and 3B show examples of a background image (left, FIG. 3A) and foot image (right, FIG. 3B) as described herein.
Figure 3B:
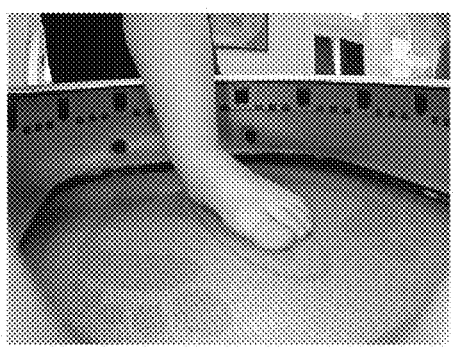

The scanning device in this example includes 16 perimeter cameras in the perimeter of the scanner to capture the view of the foot and an additional 2 alignment/pronation cameras to capture the alignment of the foot and to determine if a pronation or supination exists. The scanning device also includes 16 white light LEDs, positioned at the same angle as the angle of the cameras perimeter cameras to illuminate the scene and remove shadow, in order to improve the performances of the segmentation described below. All cameras are connected to a rounded PCB internally, which serves as a hub for all cameras and LEDs and connect to a PC or other processing device via a connection such as a USB connection. When foot measurements are performed, each camera of the scanning device takes two kind of shots: background images (denoted by B) without a foot present in the scanning field, and target (foot) images (denoted by I), as displayed for example in FIGS. 3A and 3B.

In foot images, a foot stands in the middle of the picture, possibly wearing a sock with unknown colors. In order to reconstruct a reliable 3D-model of the foot, the image of the foot must be isolated from the image of the background, by means of an algorithm sufficiently fast for real-time applications. For example, in practical use, the overall measurements procedure, including the taking of the pictures and performance of the segmentation, should not exceed a half a minute.

In framework disclosed herein, an image is modeled by a sequence of three-dimensional vectors:

$$I = \{I_k \in \mathbb{R}^3, 1 \leq k \leq N\}. \tag{3}$$

In equation (3), each vector $I_k$ is related to the k-th pixel of the image. More specifically, if $H_k$, $S_k$, $V_k$ represent respectively the hue, saturation and value of the k-th pixel, we define $$I_k \triangleq [S_k \cos(H_k); S_k \sin(H_k); V_k]^T; \tag{4}$$

that is, $I_k$ in equation (4) is a Cartesian representation of the HSV components of the k-th pixel. From equations (1) and (2) given above, it is straightforward that $0 < S_k < 1$ and $0 < V_k < 1$. As discussed previously, the JPEG compression of the images at hand introduces a color distortion, which is more crucial as the saturation decreases or as the value increases. From the results obtained on synthetic data shown in FIG. 1, it can be observed that the distortion observed in the saturation and value components is not uniformly distributed. Consequently, we define N layers of pixels, sorted accordingly to their value levels. More precisely, given a sequence $0 = a_0 < a_1 < \ldots < a_N = 1$, the N-th layer of pixels is defined as $$V_n(I) \triangleq \{I_k \in I; a_{n-1} \leq V_k \leq a_n\}, 1 \leq n \leq N. \tag{5}$$

In this example, the background used for separation is as uniformly light green as possible, and the diodes provide a uniform lighting on the scene. Therefore, the pixels in equation (5) are most likely to be well separated when n is high, whereas n being small indicates that equation (5) is less reliable for a good segmentation. The choice of the number of value layers N in equation (5) is also important. If N is too large, the polygonal representations (introduced later) are not statistically representative enough, and the processing time increases, which is problematic for real-time applications. On the other hand, too small a value of N will give poorer segmentation results. Moreover, the layers must not necessarily be uniform, since the distortion introduced by the JPEG encoding is not.

The problem being solved can be summarized as follows: given one background image B and one foot image I, with associated layers sets $V_n(B)$ and $V_n(I)$, respectively, we must associate to all pixels $I_k$ in I a label $L_k$, which is equal to 1 if this pixel belongs to the sock and 0 otherwise. As mentioned above, this segmentation is performed layer by layer.

Considering the fact that the background color of the device in this example is approximately uniformly green, we first learn models of the background based on a sample of pictures taken without any foot. In order to compensate for the low quality of the pictures, we classify pictures of the pixels accordingly to their brightness (Equation (5)). For each cluster of pixels done so, we model the background by the smallest convex polygon containing all the associated Ik (equation (4) and equation after (5)). Afterwards, considering a pixel of a picture with a foot, we test its likelihood to belong to the background by testing whether it belongs the interior of a polygon or not. Roughly speaking, pixels still belonging to the green background will be located inside one of the polygon learned, whereas a pixel belonging to a sock will more likely to fall outside.

The first step in the proposed approach is to learn a relevant model to characterize the background. As mentioned above, most (but not all) of the background pixels have a high value due to the LED lighting, and are light green, which corresponds to a hue approximately equal to 0.4. Given $V_n(B)$, the background's contribution to $V_n(B)$ is modeled by a polygon, namely the convex hull generated by the points of $V_n(B)$.

$$P_n = \text{Hull}\{\text{diag}(1,1,0) \times B_k; B_k \in V_n(B)\}, n = 1 \ldots N.$$

The proposed approach has a statistical significance: indeed it is common to model the background's contribution to the layer $V_n(B)$ with a bidimensional Gaussian mixture density. The convex hull generated by the points can be considered as a suboptimal approximation of the previous model, more suited for the real-time application in mind. For each layer $V_n(I)$, we investigate whether the pixel $I_k=[S_k \cos(H_k); S_k \sin(H_k); V_k]^T$ belongs to the sock or not as follows: if the 2D-point $[S_k \cos(H_k); S_k \sin(H_k)]^T$ has either a low saturation or lies outside a scaled version of $P_n$, say $\alpha_n P_n$ we set the label $L_k=1$. Otherwise, we set $L_k=0$. The motivation for this labeling is two-fold: if $[S_k \cos(H_k); S_k \sin(H_k)]^T$ is inside $\alpha_n P_n$, then the pixel most likely belongs to the background. Furthermore, since the background is green and well-lit because of the LEDs, any pixel with a low saturation most likely belongs to a dark sock. We therefore summarize the segmentation as $$L_k = \begin{cases} 1 & \text{if } diag(1,1,0) \times I_k \notin \alpha_n \mathcal{P}_n \text{ or } S_k < s_n \\ 0 & \text{otherwise} \end{cases},$$

for all $I_k \in \mathcal{V}_n(I)$ where the parameter $\alpha_n$ is a scaling factor depending on the layer considered.

Next, results with pictures taken from the scanning device are presented. The presented algorithm was implemented (for purposes of example) in the C# object-oriented programming language, and the execution time for one image on a i7-computer was of the order of magnitude of 800 ms, making it relevant for a real-time implementation. We present results on four types of foot/socks:

The Pink dataset: a model of the foot wearing a pink sock; this can be considered as an easy case, for the sock's hue is very distinguishable from the light green background;

The Funky Black dataset: a model of the foot wearing a black sock with gray spots; this kind of sock is hard to isolate from the background with a Hue-based segmentation procedure, due to the low S and V values;

The White dataset: a model of the foot wearing a white sock; as in the Funky Black case, this kind of sock is hard to isolate from the background with a Hue-based segmentation procedure;

The Duboni dataset: a bare foot.

Samples from these four datasets are displayed in FIGS. 4A to 4D. For each experiments, a mask is applied to get rid of the upper part of the picture, and the results obtained with the disclosed segmentation procedure are compared to a segmentation performed manually. The error rate is defined as the number of falsely classified pixels divided by the overall number of pixel in the picture.

To obtain optimal performance, rule-of-thumb settings are provided. The number of layers should be carefully chosen: too large of a number of layers may result in overfitting, whereas too small of a number of layers introduces a large bias in the performances. From the graphs illustrated in FIGS. 5A to 5D, it can be seen that a good choice for the number of layers lies between 20 and 50 for an overall good segmentation performances.

A parameter of interest is also sn, the threshold below which a point is systematically chosen as belonging to the sock; from the results illustrated in FIGS. 6A to 6D, it can been observed that this parameter is of less importance for colored socks or human skin, while it is critical for black, white and grey socks. A good value for overall performances is to set uniformly sn=0.25.

Examples of results obtained with the disclosed segmentation method are displayed in FIGS. 7A-7D. These results are presented without any mathematical morphology post-processing involved. It can be observed that the proposed approach is quite robust to the color of the sock, though the results obtained in favorable cases (pink sock and bare foot) are obviously better. On the whole database, the average segmentation error lies between 2% and 4%, which is quite good and sufficient for the purpose of the scanning device.

An advantage of such an algorithm is twofold: first, it allows us to process pictures taken from "low-tech" cameras, whose high compression rates yield numerous artifacts in the pictures which can be classified as sock-pixels while actually belonging to the background, or the opposite. The fact that we separate the HSV space into layers allows us to discard these artifacts, by taking only the relevant layers into account. This ability to process pictures from standard or low-quality cameras allows reduced production costs. Furthermore, the computation of the convex hull and the test of belonging to a convex polygon can be done efficiently using very fast algorithms, which are usually faster than standard background learning methods. This comes at the cost of a slight decrease in the segmentation performances (2-4%, while state-of-the-art methods range to ~1%), however this error rate is more than enough for industrial uses.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A method of isolating an object of interest present in a target image taken of an imaging field, comprising the steps of:
   capturing a background image of the imaging field without the object of interest present using an imaging system;
   capturing a target image of the imaging field with the object of interest present using the imaging system;
   using at least one processor:
      classifying pixels of the background image according to their brightness;
      sorting the pixels of the background image into layers of pixels having similar brightness;
      modeling the background image by a convex polygon; and
      determining which pixels in the target image fall inside of the convex polygon and which pixels in the target image fall outside of the convex polygon;
   whereby:
   pixels in the target image that belong outside of the convex polygon are considered to be pixels of the object of interest.

2. The method of claim 1, wherein the images captured by the imaging system are subjected to lossy compression before the pixels are classified.

3. The method of claim 2, wherein said lossy compression comprises JPEG compression.

4. The method of claim 1, wherein the modeling of the background image is performed using a complex hull algorithm.

* * * * *